UNITED STATES PATENT OFFICE.

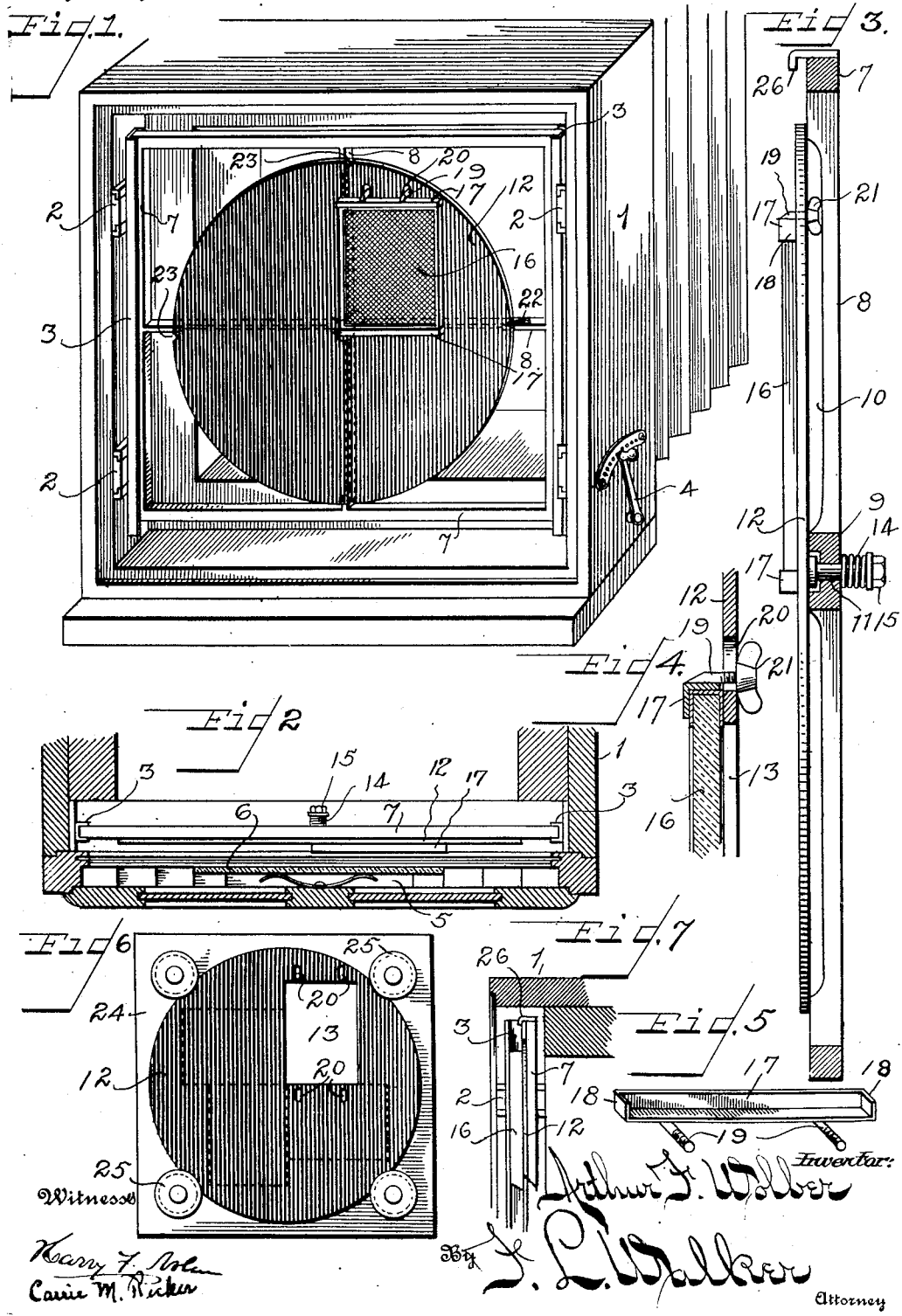

ARTHUR F. WOLBER, OF DAYTON, OHIO.

PHOTOGRAPHIC SCREEN.

1,226,838.   Specification of Letters Patent.   Patented May 22, 1917.

Application filed April 18, 1916. Serial No. 91,994.

*To all whom it may concern:*

Be it known that I, ARTHUR F. WOLBER, citizen of the United States, residing at Dayton, in the county of Montgomery and State of Ohio, have invented certain new and useful Improvements in Photographic Screens, of which the following is a specification.

My invention relates to photographic apparatus and more particularly to a multiple exposure screen carrier for a process engraving camera.

The object of the invention is to simplify the structure as well as the means and mode of operation of such devices whereby they will not only be cheapened in construction, but will be more efficient in use, positive and accurate in operation, convenient, economical and unlikely to get out of repair.

A further object of the invention is to provide improved means by which multiple exposures may be made upon a single photographic plate and to further provide means to enable the use of a cross line or half tone screen of comparatively small size with a photographic plate of larger dimensions.

A further object of the invention is to provide improved form of carrier for the cross line or half tone screen whereby said screen may be successively presented in different positions in relation with the photographic plate.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of the rear portion of a process engraving camera to which has been applied the adjustable mask and screen carrier forming the subject matter hereof. Fig. 2 is a sectional plan view of the rear portion of the camera and plate holder showing the relation of the screen carrier and the photographic plate. Fig. 3 is a side elevation of the assembled apparatus forming the subject matter hereof, the supporting frame being shown in section. Fig. 4 is a detail sectional view of the screen supporting means. Fig. 5 is a detail perspective view of one of the screen supporting bars. Fig. 6 is a front elevation of a modification of the construction shown in Fig. 1 with the half tone screen and supporting bars removed. Fig. 7 is a detail sectional view illustrating the use of the apparatus in conjunction with a half tone or cross line screen of large size.

Like parts are indicated by similar characters of reference throughout the several views.

A very large proportion of the orders for commercial process engraving involve the production of cuts of minimum size, much less than the size of the photographic plates commonly employed. To reproduce a single minimum copy or a group of copies of small size at a single exposure upon a large photographic plate involves loss of plate space and sensitizing material and a loss of time of the operator in preparing and changing plates for succeeding exposures. Copies can only be grouped to produce a plurality of reproductions by a single exposure when the degree of reduction or enlargement of each copy is identical. In a commercial practice it seldom occurs that a number of reproductions are to be made at the same time with equal reduction. Therefore, only a small area of the photographic plate is required for each reproduction.

One of the objects of the present invention is to provide an adjustable mask by which small areas of the photographic plate may be exposed successively, thereby enabling multiple exposures to be made upon a single plate. I am aware that movable masks for enabling multiple exposures are not broadly new in the art. The present construction, however, involves certain new and novel features whereby the construction and operation of such devices is materially improved and the apparatus is made available in practical form for the commercial operator.

A further and important feature of the present invention is to provide a movable carrier for the cross line or half tone screen, enabling the photographic plate and screen to be presented in different relative positions. The usual half tone screen is quite expensive and the cost of such screens increases at a ratio very much greater than the relative proportions of the screen. That is, a screen of large size is very much more costly in proportion to its area than a screen of comparatively small size. As before stated, the greater proportion of commercial work is of minimum size; therefore a screen of small size may be used in lieu of the large and costly screen. Thus, not only the initial outlay of the cost of equipment is reduced to minimum, but also the danger of loss through breakage of large screens is avoided. By the construction herein shown and described the screen of small size is successively presented in different positions in relation with the plate whereby multiple exposures may be made upon a single photographic plate through a screen of much less area than that of the plate.

Referring to the drawings, 1 is the rear frame of the process camera. Mounted in this frame 1 is the usual screen gear comprising the reciprocatory slides 2—2 carrying the vertically disposed channel bars 3—3 which are shifted to and from the photographic plate by means of the adjusting lever 4 at the side of the camera frame. The plate holder 5 is adapted to be engaged with the rear frame 1 of the camera as shown in Fig. 2. Positioned within the plate holder 5 is the sensitized photographic plate 6. This is the usual construction found in process cameras except that in some instances the movable screen gear may be mounted in the plate holder instead of the camera frame.

The apparatus forming the subject matter hereof comprises a main rectangular supporting frame 7 divided medially by cross mullions 8. At the juncture of the mullions there is formed a hub 9. The mullions 8 are reduced or cut away as indicated at 10 to provide clearance for the screen attaching nuts hereafter mentioned.

Journaled in the hub 9 upon a suitable trunnion 11 and rotating in a plane parallel with the main frame 8 is a disk or mask 12 of opaque or non-actinic material having formed therein an exposure opening as at 13 in Fig. 6. The mask 12 extends slightly beyond the reduced portion 10 of the mullions upon which it bears at its periphery. In order that the disk or mask may bear closely upon the main frame and by its engagement upon the mullions be held in perfect alinement, there is provided upon the trunnion 11 a helical tension spring 14 bearing at one end against the hub 9 and at its opposite end upon an adjusting nut 15 carried by the trunnion 11. The trunnion 11, not only being revoluble within the hub 9 but also capable of a limited longitudinal movement, enables the tension spring 14 to maintain the disk or mask constantly in close engagement with the main supporting frame 8 and automatically takes up any play or lost motion due to wear.

The opening 13 is preferably equal substantially one fourth of the standard photographic plate to be employed. By rotating the disk or mask 12 about the trunnion 11 the opening 13 is brought successively to different positions as indicated by dotted lines in Fig. 6, thus enabling each portion of the plate to be successively and independently exposed. The mask 12 protects three fourths of the plate while the remaining quarter of the plate is being exposed through the opening 13.

Carried upon the mask or disk 12 and registering with the opening 13 is a quarter plate filter or screen 16 detachably engaged with the disk or mask by means of retaining bars 17. The retaining bars 17, as shown in detail in Fig. 5, comprise angle bars having at their ends heads or flanges 18. They are supported by laterally disposed shanks or stems 19 extending through slotted openings 20 in the mask or disk which carry clamping nuts 21 on the opposite side of the disk. The bars 17 are so proportioned and spaced as to engage the opposite ends of the cross line or half tone screen 16. The screen may be released for replacement with a screen of different character or ruling by loosening the nuts 21 and shifting one of the retaining bars away from the screen within the limits of the slot 20. The heads or end flanges 18 of the retaining bars prevent the disengagement of the screen therefrom when the mask or disk is rotated. The relation of the retaining bar 13 and screen with the disk or mask is shown in the enlarged detail view Fig. 4.

A spring detent 22 carried by the main frame 8 engages notches 23 in the periphery of the disk 12 to retain the disk in its adjusted position. By the rotation of the mask or disk the quarter plate screen 16 is successively presented in different positions whereby the full photographic plate is covered by the quarter plate screen.

In practice it is the custom to employ the screen in such positions that the cross rulings are arranged at angles of 45 degrees. It will be noted that in each of the four positions to which the mask and screen are adjustable the rulings will be presented in the same position.

In Fig. 6 there is shown a modification of the construction heretofore described in which a rectangular main frame 24 having therein a circular opening is employed in lieu of the frame 8. Carried upon the face of the frame 24 are a plurality of grooved guides, preferably rollers, 25 within the peripheral grooves of which is engaged the periphery of the revoluble disk or mask 12 before described. The construction and operation of the mask is exactly the same as that before described except that in the construction shown in Fig. 6 the use of the central pivot is avoided and the mask is supported upon the rollers 25. The screen 16 is secured to the disk and employed in the same manner in the construction shown in Fig. 6 as that previously described.

For certain conditions of use it may be desirable to employ a whole plate screen in lieu of the quarter plate screen before mentioned. Under such conditions the quarter plate screen is removed and the retaining bars 17 are detached by disengaging the nuts 21. The full plate screen is then supported in its usual position in the screen gear and the frame 8 carrying the mask or disk 12 is hung upon the upper ends of the upright channels 3—3 of the screen gear by means of offset fingers 26 (Fig. 7). By this arrangement the disk or mask is positioned immediately in front of the full plate screen and by its rotation multiple exposures may be made through the full plate screen by exposing limited portions of the plate at each operation.

While the preferable construction is such that the method of operation is to rotate the screen or mask to present the quarter plate screen 16 successively in registry with different portions of the sensitized plate, it will be obvious that the same result may be attained by maintaining the mask or disk and screen 16 stationary and rotating the plate holder or the sensitized plate. Inasmuch, however, as rotary backs for cameras and rotary plate holders are well known in the art, such modification will not be here illustrated. It is obvious, however, that such well known revoluble back may be employed in lieu of rotating the mask or disk 20.

The term "photographic plate" as here used is to be understood as including sensitized film, paper, or other material used as support for the sensitized emulsion, while the term "screen" is intended to include light filters or other bodies through which photographic exposures are made as well as ruled half tone screens. The mask is to be understood as being of any material which will neutralize or modify the actinic action of the light on the sensitized media.

From the above description it will be apparent that there is thus provided a device of the character described possessing the particular features of advantage before enumerated as desirable but which obviously is susceptible of modification in its proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a photographic apparatus, a transparent screen through which a limited area of the plate may be exposed, and a movable carrier for the screen adapted to successively present the screen in registry with different portions of the photographic plate.

2. In a photographic apparatus, a screen of less area than the photographic plate operated upon, a mask for that portion of the plate not covered by the screen, the plate and the mask being relatively movable whereby the screen will be successively presented in registry with those portions of the plate uncovered by the relative movement of the mask and plate.

3. In a photographic apparatus, a screen of less area than the photographic plate operated upon, and a support for said screen, the screen and photographic plate being relatively movable whereby the screen may be successively presented in registry with different portions of the plate, substantially as specified.

4. In a photographic apparatus, a screen through which photographic exposures are made, and a rotatable support therefor by the rotation of which the screen may be presented in different radial positions in relation with the photographic plate operated upon.

5. In a photographic apparatus, a mask for a photographic plate adapted to expose a limited portion of the plate, a screen attached to the mask through which the unmasked portion of the plate is exposed, the mask with its attached screen and the plate being relatively rotatable in relation one with the other whereby different portions of the plate may be successively exposed through said screen.

6. The combination with a camera having a forwardly and rearwardly movable screen gear of a supporting frame carried by said screen gear, a rotatable mask carried by the frame and a transparent screen carried by the mask, substantially as and for the purpose specified.

7. A camera accessory comprising a supporting frame, a rotatable mask carried thereon and a transparent screen carried by the mask.

8. A camera accessory comprising a supporting frame, a revoluble mask, a trunnion for said mask, said mask being capable of both rotary and longitudinal movement in relation with said frame, and a spring tending to move the mask toward said frame.

9. A camera accessory comprising a rotary mask and transparent screen detachably engaged with the mask and movable therewith to different radial positions by the rotation of the mask.

10. A camera accessory comprising a supporting frame, a mask carried thereby and supporting fingers for engaging the frame with the screen gear of a camera whereby said frame and mask will be supported upon and movable with said screen gear.

11. A camera accessory comprising a mask, a photographic screen and recessed retaining bars carried by the mask within which the opposite extremities of the screen may be detachably engaged.

12. A camera accessory comprising a mask, a photographic screen and retaining means for the screen slidably mounted upon the mask and movable in relation therewith into and out of engagement with the screen, substantially as specified.

13. In a photographic apparatus, a photographic screen through which a portion only of a photographic plate is exposed, and a mask protecting the remaining portion of said plate against exposure, said mask and photographic plate being relatively movable whereby remaining portions of said plate will be successively exposed through said screen by the relative movement of the mask and plate.

14. In a photographic apparatus, the combination of a photographic screen and a mask coöperating therewith to separately expose through said screen limited portions of a photographic plate, said photographic plate and mask being relatively movable substantially as and for the purpose specified.

In testimony whereof I have hereunto set my hand this 15th day of April A. D. 1916.

ARTHUR F. WOLBER.

Witnesses:
　EDW. E. DUNCAN,
　FRANK L. WALKER.